(12) United States Patent
Mudgal et al.

(10) Patent No.: US 12,613,838 B2
(45) Date of Patent: Apr. 28, 2026

(54) FINGERPRINT-BASED DATA REPLICATION ACROSS STORAGE SYSTEMS

(71) Applicant: Rubrik, Inc., Palo Alto, CA (US)

(72) Inventors: Aakanksha Mudgal, Bangalore (IN);
Nikhil Verma, Bangalore (IN);
Abdullah Reza, Pleasanton, CA (US);
Arjun Sinha, Mountain View, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 18/903,984

(22) Filed: Oct. 1, 2024

(65) Prior Publication Data

US 2026/0093669 A1 Apr. 2, 2026

(51) Int. Cl.
*G06F 16/182* (2019.01)
*G06F 16/11* (2019.01)
*G06F 16/14* (2019.01)

(52) U.S. Cl.
CPC ........ *G06F 16/1844* (2019.01); *G06F 16/128* (2019.01); *G06F 16/152* (2019.01)

(58) Field of Classification Search
CPC ... G06F 16/1844; G06F 16/128; G06F 16/152
USPC ........................................ 707/634
See application file for complete search history.

(56) References Cited

U.S. PATENT DOCUMENTS

| | | | | |
|---|---|---|---|---|
| 6,085,298 | A * | 7/2000 | Ohran | G06F 11/1466 |
| | | | | 711/161 |
| 7,320,009 | B1 * | 1/2008 | Srivastava | G06F 16/27 |
| | | | | 707/625 |

| | | | | |
|---|---|---|---|---|
| 9,672,054 | B1 * | 6/2017 | Gupta | G06F 9/4856 |
| 10,007,445 | B2 * | 6/2018 | Nithrakashyap | G06F 3/0641 |
| 10,114,565 | B2 * | 10/2018 | Nithrakashyap | G06F 16/84 |
| 10,303,555 | B1 * | 5/2019 | Lee | G06F 3/0641 |
| 10,346,437 | B1 * | 7/2019 | Zhong | G06F 16/283 |
| 11,074,224 | B2 * | 7/2021 | Qiu | G06F 16/178 |

(Continued)

FOREIGN PATENT DOCUMENTS

| | | | | | |
|---|---|---|---|---|---|
| CN | 103902617 | A | * | 7/2014 | G06F 11/2097 |
| CN | 117453653 | A | * | 1/2024 | G06F 16/214 |
| CN | 118509438 | A | * | 8/2024 | H04L 67/125 |

OTHER PUBLICATIONS

Shakarami et al., "Data Replication Schemes in Cloud Computing: a Survey", Cluster Computing (2021), vol. 24, pp. 2545-2579, Published Apr. 16, 2021. (Year: 2021).*

*Primary Examiner* — Phuong Thao Cao
(74) *Attorney, Agent, or Firm* — Holland & Hart LLP

(57) ABSTRACT

Methods, systems, and devices for data management are described. The described techniques may enable a data management system (DMS) to determine an amount of data to be pulled from a source cluster prior to performing a replication of a source file stored on the source cluster. For example, before copying any data from the source cluster to a target cluster, the DMS may read an index file associated with the source file to determine data blocks that are different from data blocks of a base file stored on the target cluster, which may indicate indices of data blocks of the source file that may be replicated from the source cluster to the target cluster as part of the replication operation. By profiling the data to be copied before copying the data to the target cluster, the DMS may optimize the replication process to reduce latency, among other examples.

18 Claims, 9 Drawing Sheets

(56)                        References Cited

U.S. PATENT DOCUMENTS

| | | | | |
|---|---|---|---|---|
| 2016/0019317 A1* | 1/2016 | Pawar | G06F 16/128 | |
| | | | | 707/649 |
| 2016/0259836 A1* | 9/2016 | Heathorn | G06F 16/639 | |
| 2016/0335288 A1* | 11/2016 | Qiu | G06F 16/178 | |
| 2017/0060702 A1* | 3/2017 | Dave | G06F 11/2094 | |
| 2019/0050296 A1* | 2/2019 | Luo | G06F 11/1456 | |
| 2019/0179711 A1* | 6/2019 | Luo | G06F 11/1464 | |
| 2019/0227877 A1* | 7/2019 | Pandey | G06F 16/128 | |
| 2019/0278483 A1* | 9/2019 | Mahmood | G06F 3/0604 | |
| 2020/0026777 A1* | 1/2020 | Luo | G06F 11/1464 | |
| 2020/0250201 A1* | 8/2020 | Cantwell | H04L 67/1095 | |
| 2021/0342297 A1* | 11/2021 | Gupta | G06F 16/128 | |
| 2022/0171536 A1* | 6/2022 | Watson | G06F 3/065 | |
| 2023/0401176 A1* | 12/2023 | Agrawal | G06F 16/164 | |

* cited by examiner

Input Information
710

Output Information
715

Network Interface
725

Storage
740

Replication Manager
720

Memory
730

Processor
735

705

700

Figure 8:
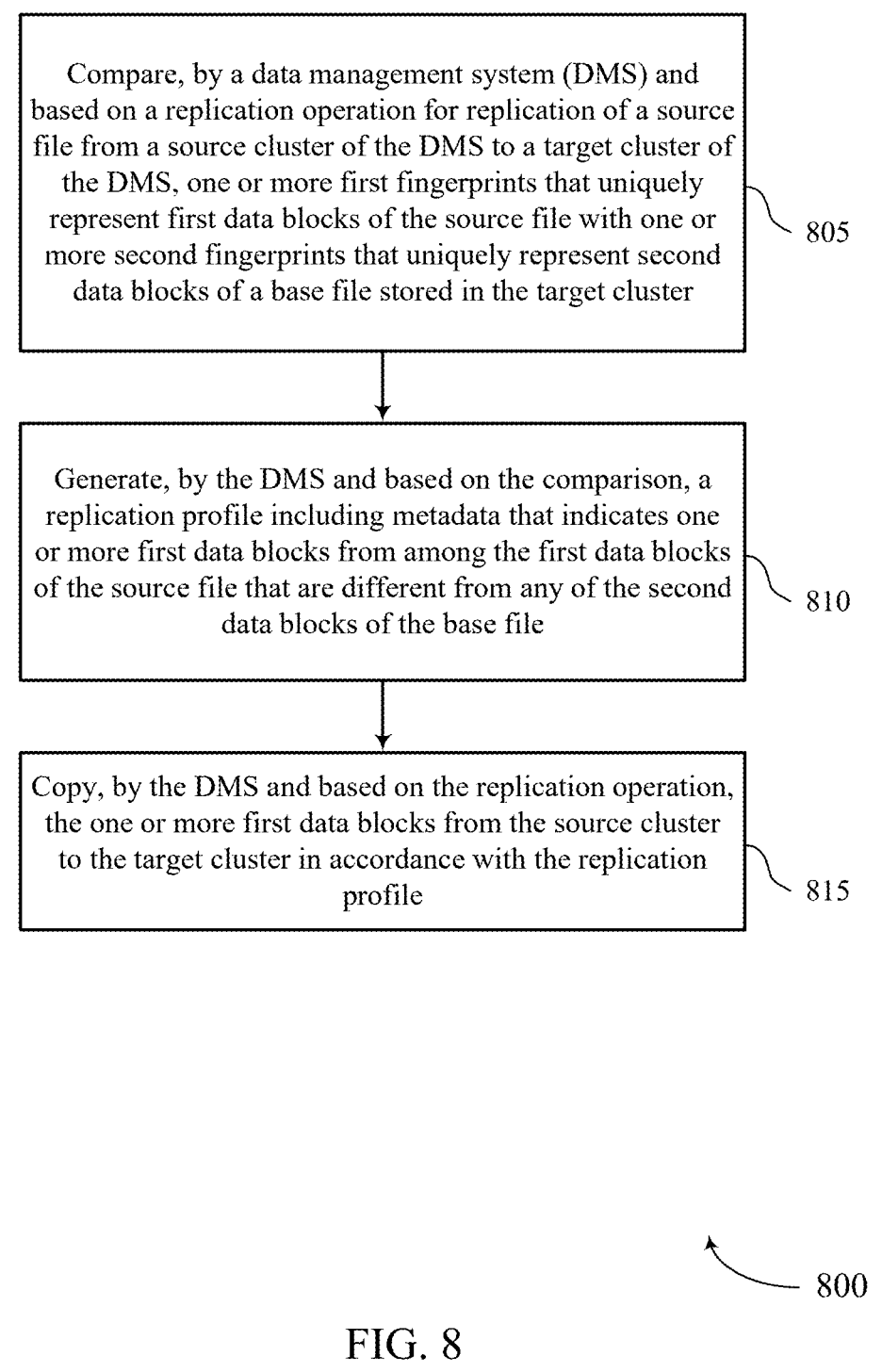

Compare, by a data management system (DMS) and based on a replication operation for replication of a source file from a source cluster of the DMS to a target cluster of the DMS, one or more first fingerprints that uniquely represent first data blocks of the source file with one or more second fingerprints that uniquely represent second data blocks of a base file stored in the target cluster

805

Generate, by the DMS and based on the comparison, a replication profile including metadata that indicates one or more first data blocks from among the first data blocks of the source file that are different from any of the second data blocks of the base file

810

Copy, by the DMS and based on the replication operation, the one or more first data blocks from the source cluster to the target cluster in accordance with the replication profile

Figure 9:
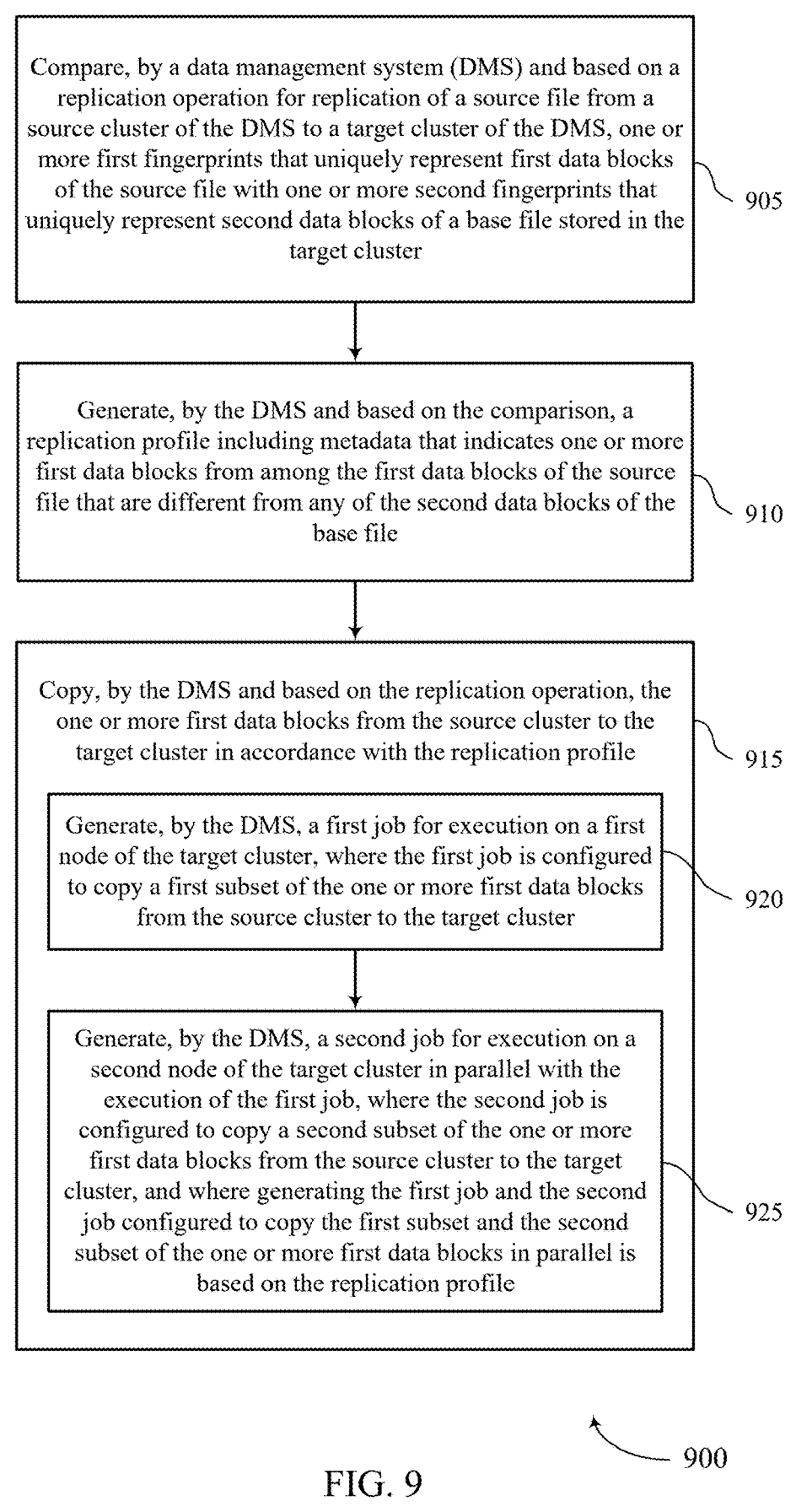

Compare, by a data management system (DMS) and based on a replication operation for replication of a source file from a source cluster of the DMS to a target cluster of the DMS, one or more first fingerprints that uniquely represent first data blocks of the source file with one or more second fingerprints that uniquely represent second data blocks of a base file stored in the target cluster

⎰ 905

Generate, by the DMS and based on the comparison, a replication profile including metadata that indicates one or more first data blocks from among the first data blocks of the source file that are different from any of the second data blocks of the base file

⎰ 910

Copy, by the DMS and based on the replication operation, the one or more first data blocks from the source cluster to the target cluster in accordance with the replication profile

⎰ 915

Generate, by the DMS, a first job for execution on a first node of the target cluster, where the first job is configured to copy a first subset of the one or more first data blocks from the source cluster to the target cluster

⎰ 920

Generate, by the DMS, a second job for execution on a second node of the target cluster in parallel with the execution of the first job, where the second job is configured to copy a second subset of the one or more first data blocks from the source cluster to the target cluster, and where generating the first job and the second job configured to copy the first subset and the second subset of the one or more first data blocks in parallel is based on the replication profile

FINGERPRINT-BASED DATA REPLICATION ACROSS STORAGE SYSTEMS

FIELD OF TECHNOLOGY

The present disclosure relates generally to data management, including techniques for fingerprint-based data replication across storage systems.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIGS. 8 and 9 show flowcharts illustrating methods that support fingerprint-based data replication across storage systems in accordance with aspects of the present disclosure.

DETAILED DESCRIPTION

Figure 1:
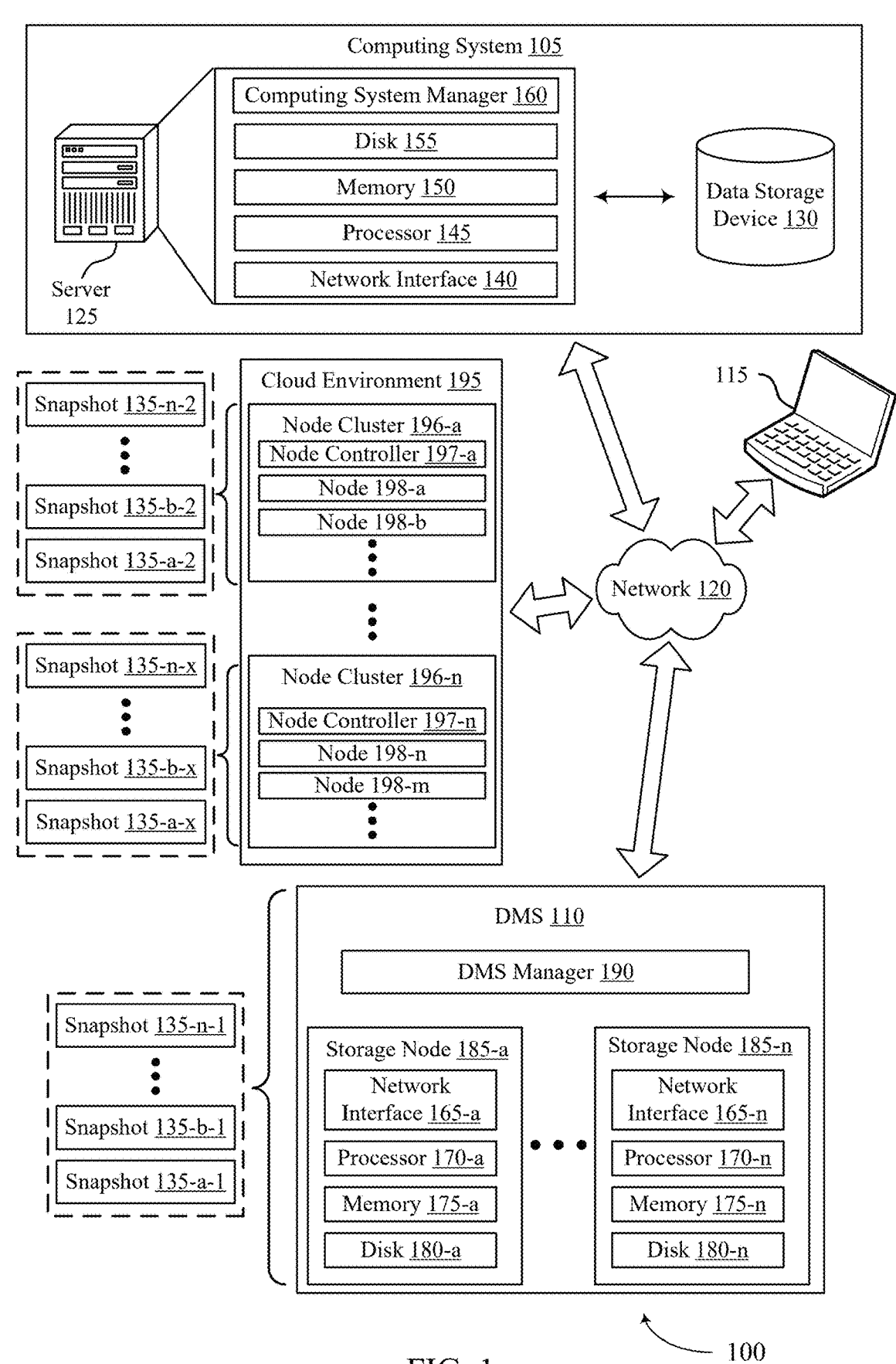
FIG. 1 illustrates an example of a computing environment that supports fingerprint-based data replication across storage systems in accordance with aspects of the present disclosure.

A data management system (DMS) may include one or more clusters of storage nodes and other sub-systems that provide backup and recovery services for customer computing systems. In some examples, a first cluster (e.g., a source cluster) may include source data (e.g., a source snapshot, a source file) that may be replicated from the source cluster to a second cluster (e.g., a target cluster). To replicate the data, the DMS may pull data from the first cluster that is different from data already stored in the second cluster. For example, the DMS may compare a fingerprint associated with a block of data in the first cluster with a fingerprint associated with a corresponding block of data in the second cluster, and may pull the block of data from the first cluster if the respective fingerprints are different. A fingerprint may be an output of a hash function (e.g., a digest generated using the hash function, which may alternatively be referred to as a hash) or some other metadata that represents (e.g., serves as a unique identifier for) a block of data. In some examples, however, comparing fingerprints for one block of data at a time during a replication operation may prevent the DMS from accurately estimating a quantity of data that will ultimately be pulled from the first cluster as part of the replication operation. Additionally, pulling data immediately after determining that the fingerprints are different may support pulling one block of data at a time instead of more than one block in parallel, which may not fill an available bandwidth within the DMS for replication and may therefore limit replication speed and efficiency.

Accordingly, techniques described herein may enable the DMS to determine, prior to a replication operation of a source file, a quantity of data to be pulled from the source cluster as part of the replication operation. For example, before copying any data between clusters, the DMS may read a fingerprint file, an index file (e.g., an extent index file), or both associated with the source file to determine blocks of data (e.g., which blocks, how many blocks) that will be replicated across the clusters as part of the replication operation. The index file may indicate, for one or more blocks of data of a patch file associated with the source snapshot, a fingerprint (e.g., a hash) of an offset for a respective block of data in the patch file (e.g., a sparse file including changes relative to a data map representing a previous snapshot). The fingerprint file may include fingerprints that point to ranges of entries in the index file.

The DMS may compare the fingerprint file and/or the index file for the source file to a fingerprint file or index file of a base file in the target cluster to determine one or more entries of the index file that include fingerprints to changed data blocks. The DMS may compute, based on the index file, a set of indices (e.g., in an intermediate replication profile (RPF)) of data blocks of the source file that are different from data blocks of the base file and may therefore be pulled for replication of the source file as part of the replication operation. The DMS may therefore determine a total amount of data to be pulled from the source cluster to the target cluster, and may provide the user with a relatively more accurate estimation of replication progress.

The RPF may additionally, or alternatively, provide for the replication to be performed in parallel. For example, one or more target cluster nodes in the target cluster may perform child jobs in a parallel manner to read the RPF and pull the corresponding data from the source cluster. The second cluster may accordingly use the information in the RPF to distribute the child jobs evenly across the target cluster nodes and may efficiently use a full available bandwidth to perform the replication, which may decrease a latency associated with performing the replication.

FIG. 1 illustrates an example of a computing environment 100 that supports fingerprint-based data replication across storage systems in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. In some cases, a computing object that is the subject of a snapshot 135 may be or include a collection of multiple objects (e.g., computing objects may have hierarchical relationships, with lower-level computing objects included within one or more higher-level computing objects). For example, a filesystem may include multiple files, and along with the filesystem being a computing object, the files therein may also be computing objects. Or, as another example, a database may include multiple tables, and along with the database being a computing object, the tables therein may also be computing objects. Thus, a snapshot may be of one or more computing objects, and a snapshot of a first computing object (e.g., a higher-level computing object) may also be a snapshot of each computing object (e.g., each lower-level computing object) that is included in (e.g., is a member or component of) the first computing object. Additionally, a snapshot may be of one or more lower-level computing objects individually (e.g., a snapshot of a lower-level computing object may be separate from another snapshot of another lower-level computing object, separate from another snapshot of a higher-level computing object that contains the lower-level computing object, or both).

A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. A base snapshot 135 may alternatively be referred to as a full snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a base snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a base snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-a may be associated with the first customer or tenant associated with the computing system 105. The DMS 110 may obtain (e.g., generate or receive) and transfer the snapshots 135 associated with the computing system 105 to the node cluster 196-a in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-n in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

In some examples of the computing environment 100, a DMS 110 may determine a quantity of data to be pulled from a source node cluster 196 prior to performing a replication of a source file stored on the source node cluster 196. For example, before copying any data from the source node cluster 196 to a target node cluster 196, the DMS 110 may read a fingerprint file, an index file (e.g., an extent index file), or both associated with the source file to determine blocks of data (e.g., which blocks, how many blocks) that are different from data blocks of a base snapshot stored on the target node cluster 196. The DMS 110 may accordingly compute a set of indices (e.g., in an intermediate RPF) of data blocks of the source file that may be replicated from the source node cluster 196 to the target node cluster 196 as part of the replication operation. The DMS 110 may determine a total amount of data to be pulled from the source node cluster 196 to the target node cluster 196, and may provide a user with an estimation of replication progress (e.g., a percentage of data blocks that have been replicated out of the total amount of data blocks to be replicated).

Figure 2:
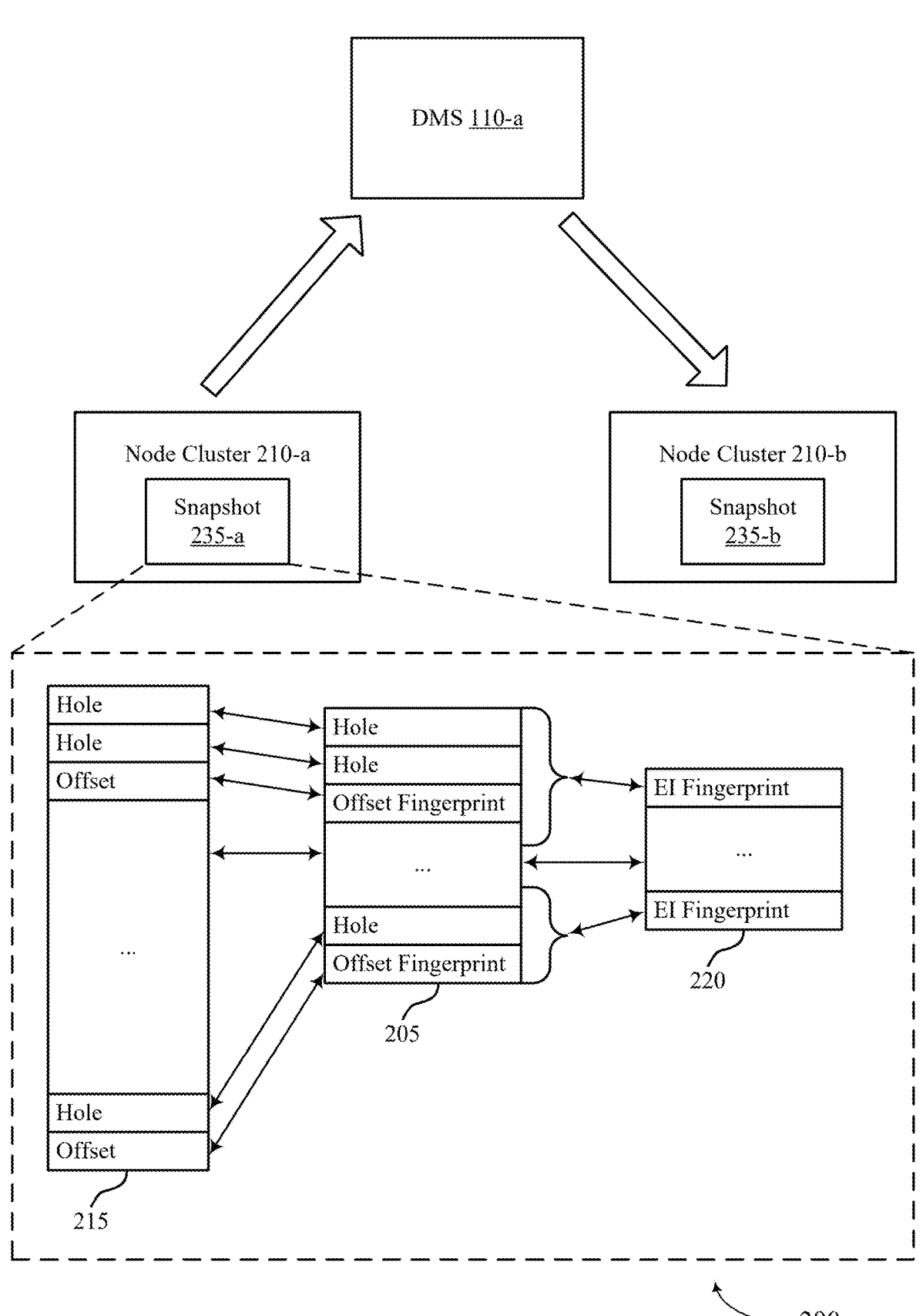
FIG. 2 shows an example of a system that supports fingerprint-based data replication across storage systems in accordance with aspects of the present disclosure.

FIG. 2 shows an example of a system 200 that supports fingerprint-based data replication across storage systems in accordance with aspects of the present disclosure. The system 200 may implement or may be implemented by aspects of the computing environment 100. For example, the system 200 may be implemented by a DMS 110-a and one or more node clusters 210, which may be examples of a DMS 110 and either node clusters 196 or storage nodes 185, respectively, as described with reference to FIG. 1.

The one or more node clusters 210 (e.g., a node cluster 210-b, a node cluster 210-b) may be included in the DMS 110-a, in some examples. For example, the DMS 110-a may store one or more snapshots 235 across one or more storage nodes within or otherwise coupled with the DMS 110-a, such as the storage nodes 185 described with reference to FIG. 1. In such cases, each node cluster 210 may include or represent one or more storage nodes. Additionally, or alternatively, the one or more node clusters 210 may be external to or otherwise coupled with the DMS 110-a. For example, the one or more node clusters 210 may be part of a cloud environment, such as the cloud environment 195 described with reference to FIG. 1, and the cloud environment may be coupled with or otherwise in communication with the DMS 110-a via a network.

The DMS 110-a may thereby store snapshots 235 within one or more node clusters 210 that are included in or otherwise coupled with or in communication with the DMS 110-a. The DMS 110-a may replicate a snapshot 235-a (e.g., a source snapshot, a source file) from the node cluster 210-a to the node cluster 210-b. Data related to the snapshot 235-a may be stored on the node cluster 210-a as one or more patch files 215. For example, the patch file 215 may include a portion of the snapshot-related data (e.g., a shard) and/or all of the snapshot-related data. In some examples, the patch file 215 may be a sparse file including one or more blocks of data (e.g., 64 kilobyte (KB) blocks of data, or some other size). For example, each block of data may indicate an offset between data stored in a data map (e.g., data representing an original snapshot) and the corresponding data stored in the snapshot 235-a. If there is no data (e.g., no changed data) within one or more blocks of data in the snapshot 235-a, the patch file 215 may include a hole (e.g., null data, empty space, if the offset between the data in the data map and the corresponding data in the snapshot 235-a is 0).

The DMS 110-a may additionally maintain an index file 205 (e.g., an extent index) that indicates fingerprints (e.g., hashes) of each block of data in the patch file 215. The index file 205 may accordingly be a sparse file (e.g., with holes corresponding to the holes of the patch file 215). A size of the index file 205 may be smaller than a size of the patch file 215 because the fingerprints of the data blocks may be relatively small in size. The DMS 110-a may generate a fingerprint file 220 of the index file 205. The fingerprint file 220 may include fingerprints (e.g., hashes) of one or more ranges of entries of the index file 205 (e.g., fingerprints of 64 KB portions of the index file 205, or other range sizes). The fingerprint file 220 may therefore not be a sparse file. That is, the fingerprint file 220 may represent a full logical space of the snapshot 235-a rather than blocks of changed data written for or specific to the snapshot 235-a. In some examples, a merged journal file (MJF) may present a consolidated view of a chain of patch files 215 (e.g., a chain of shards) associated with the snapshot 235-a. A user may accordingly use the MJF to issue reads of the snapshot 235-a for any range of data of the snapshot 235-a.

In some examples, to replicate the snapshot 235-a to the node cluster 210-b (e.g., a target node cluster) from the node cluster 210-a (e.g., a source node cluster), the DMS 110-a may perform data pulls in series for each shard of data (e.g., one data block at a time). For example, as part of a replication operation, the DMS 110-a may traverse a logical space of the patch file 215 one block of data at a time (e.g., 64 KB at a time). The DMS 110-a may determine if the block of data is different from a corresponding block of data of a snapshot 235-b (e.g., a base snapshot, a base file) stored on the node cluster 210-b. That is, the DMS 110-a may compare a first fingerprint (e.g., a hash) of the block of data with a second fingerprint of the corresponding block of data of the snapshot 235-b. If the first fingerprint is different from the second fingerprint, the DMS 110-a may determine that the block of data should be read (e.g., pulled) from the node cluster 210-a to the node cluster 210-b (e.g., over the wire). If the first fingerprint is not different from the second fingerprint, the DMS 110-a may determine that the block of data may not be read from the node cluster 210-a to the node cluster 210-b, and may instead use the existing data of the corresponding block of data on the node cluster 210-b.

Some systems may perform a fingerprint comparison to determine whether to pull data as part of a replication operation (e.g., one block of data at a time). Accordingly, such systems may not be able to estimate a total amount of data to be pulled from one node cluster 210 to another node cluster 210 prior to the replication operation. Such systems may therefore not provide an accurate estimation of progress of the replication operation (e.g., to a user), but may instead indicate whether or not the replication operation is finished. The user may therefore not be aware of a duration of the replication operation until the replication operation is complete. Additionally, such systems may sequentially interleave the fingerprint comparison and data pull operations for each block of data. Replication jobs to copy the data from one node cluster 210 to another node cluster 210 may therefore be performed sequentially (e.g., rather than in parallel) and may be unbalanced, which may result in a relatively longer replication operation due to using less than a full bandwidth available for replication.

Accordingly, to improve replication efficiency and performance as described herein, the DMS 110-a may determine a total amount of data to be pulled from the node cluster 210-a to the node cluster 210-b prior to performing the replication of the data across clusters. The DMS 110-a may therefore report a replication progress to the user and may allocate replication jobs more evenly across nodes of the node cluster 210-b (e.g., in parallel), which may result in a relatively faster replication operation. For example, the DMS 110-a may generate an RPF that indicates the blocks of data of the snapshot 235-a that are different from the blocks of data of the snapshot 235-b (e.g., and may therefore be copied to the node cluster 210-b) prior to performing the replication operation.

In some aspects, to generate the RPF, the DMS 110-a may pull the fingerprint file 220 for the snapshot 235-a (e.g., the source snapshot, the source file). The fingerprint file 220 may be relatively smaller than the index file 205 and the patch file 215 (e.g., due to representing fingerprints of fingerprints of the patch file 215). The DMS 110-a may additionally obtain a local fingerprint file of the snapshot 235-b (e.g., the base snapshot) stored on the node cluster 210-b. The DMS 110-a may compare the fingerprint file 220 of the snapshot 235-a and the fingerprint file of the snapshot 235-b to determine one or more ranges of entries of the index file 205 that may represent blocks of data of the patch file 215 of the snapshot 235-a that are different from blocks of data associated with the snapshot 235-b. For example, if a first entry in the fingerprint file 220 of the snapshot 235-a is different from a corresponding first entry in the fingerprint file of the snapshot 235-b, the DMS 110-a may determine that at least a portion of the data within the corresponding logical address range is different between the snapshots 235-a and 235-b.

The DMS 110-*a* may accordingly pull the associated entries of the index file 205 (e.g., rather than the full index file 205) and compare the entries of the index file 205 to corresponding entries of a local index file chain associated with the snapshot 235-*b*. That is, the DMS 110-*a* may pull (e.g., read) the entries that map to the one or more identified entries in the fingerprint file 220 that are different. The DMS 110-*a* may deduplicate the index file 205 against the local index file chain associated with the snapshot 235-*b* to obtain a set of indices of blocks of data of the snapshot 235-*a* that are different from the corresponding blocks of data of the snapshot 235-*b*. For example, if a first fingerprint in the index file 205 is different from a corresponding first fingerprint in the local index file chain that maps to a same logical block address as the first fingerprint in the index file 205, the DMS 110-*a* may obtain an index of the corresponding block of data at the logical block address.

The DMS 110-*a* may store the indices of the identified blocks of data that are different within an RPF. The DMS 110-*a* may therefore generate the RPF representing the data (e.g., the size of data, the quantity of blocks of data) of the snapshot 235-*a* that may be copied (e.g., pulled) to the node cluster 210-*b* from the node cluster 210-*a*. In some examples, the RPF may store metadata associated with the patch file 215. For example, the RPF may store references (e.g., links) to existing blocks of data of the snapshot 235-*b* that are the same as the corresponding blocks of data of the snapshot 235-*a* and start offsets of data blocks to be read from the node cluster 210-*a* (e.g., blocks of data of the snapshot 235-*a* that are different from the corresponding blocks of data of the snapshot 235-*b*). The DMS 110-*a* may store the RPF as a key-value-store file, where the key represents an offset for each block of data and the value represents either the reference of an existing block of data on the node cluster 210-*b* or a start offset of a corresponding block of data to be pulled from the node cluster 210-*a*. The RPF may thereby be relatively small in size as compared with the patch file 215, as the RPF may not include the actual data, but may include metadata associated with portions of the data. The RPF may be stored locally at the DMS 110-*a*, within a cloud environment, or on one or more other nodes or components coupled with the DMS 110-*a*.

The DMS 110-*a* may form an RPF for each shard (e.g., for each patch file representing the snapshot 235-*a*) and may copy blocks of data from the node cluster 210-*a* to the node cluster 210-*b* in accordance with the RPFs. The DMS 110-*a* may determine a total amount of data to be pulled from the node cluster 210-*a* to the node cluster 210-*b* (e.g., the quantity of blocks of data to be pulled multiplied by the block size) based on the RPFs, and may accordingly report to the user a progress of the replication operation (e.g., a percentage of data of the total amount of data that has been replicated to the node cluster 210-*b*) and/or an estimated time or remaining time of the replication operation in real time during the replication operation. For example, the DMS 110-*a* may report a real-time percentage of data that has been transferred divided by the total volume of data to be fetched over the wire.

To perform the replication operation, the DMS 110-*a* may iterate through each RPF in offset order and pull the indicated blocks of data from the MJF associated with the snapshot 235-*a*. As the MJF provides a comprehensive view of the snapshot 235-*a*, the DMS 110-*a* may select the indicated blocks of data from the MJF using the offsets indicated in the RPF (e.g., without any additional metadata).

To read each RPF and pull the indicated data from the node cluster 210-*a* to the node cluster 210-*b*, the system 200 may conduct multiple child replication jobs running in parallel on nodes of the node cluster 210-*b*. For example, a first node may run a first child job corresponding to a first shard of the snapshot 235-*a* and a second node may run a second child job corresponding to a second shard of the snapshot 235-*a* (e.g., at the same time). The child replication jobs may accordingly generate patch files on the node cluster 210-*b* for each shard. The child replication jobs and optimizations thereto are described in further detail elsewhere herein, including with reference to FIG. 3.

Figure 3:
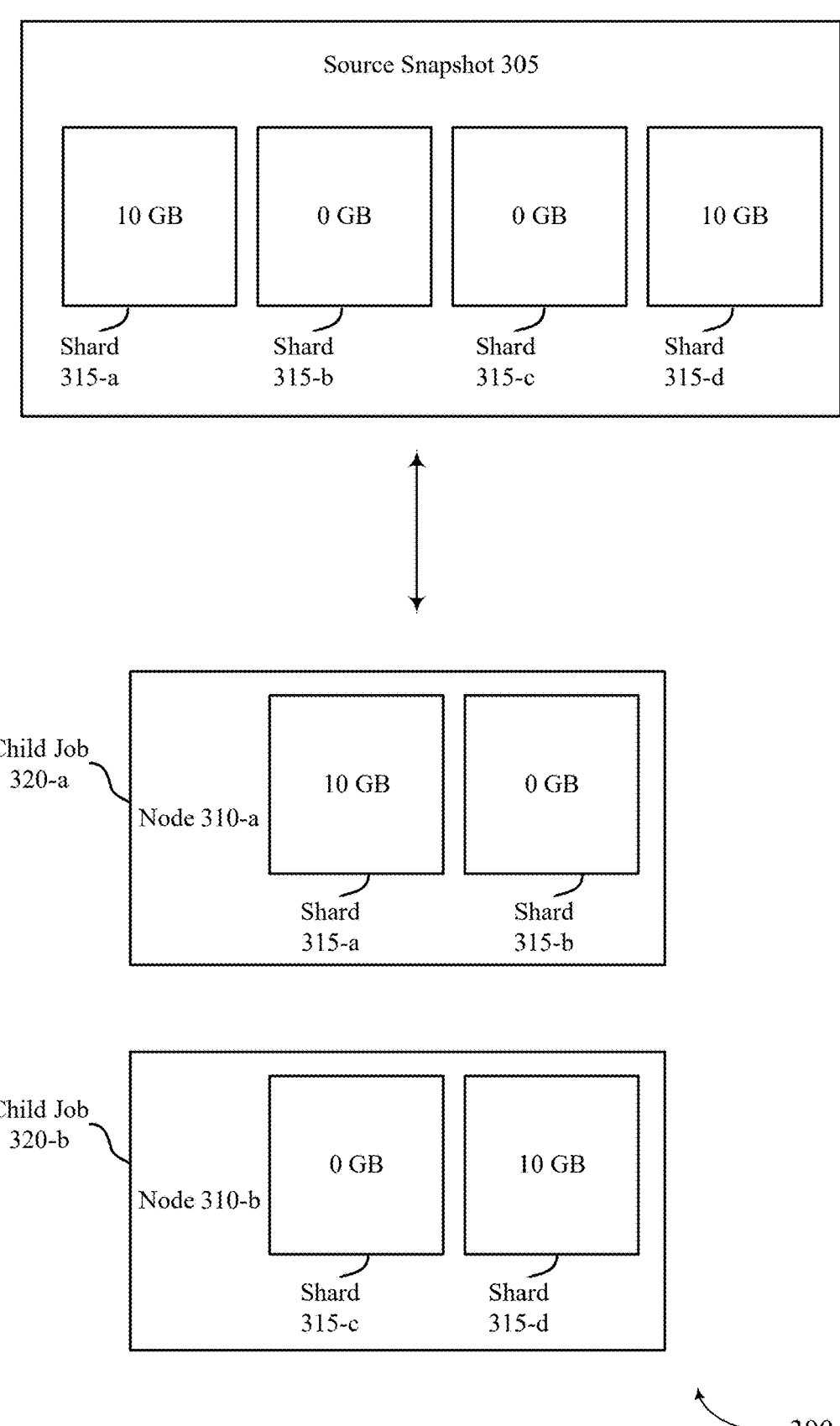
FIG. 3 shows an example of a system that supports fingerprint-based data replication across storage systems in accordance with aspects of the present disclosure.

FIG. 3 shows an example of a system 300 that supports fingerprint-based data replication across storage systems in accordance with aspects of the present disclosure. The system 300 may implement or may be implemented by aspects of the computing environment 100 or the system 200. For example, the system 300 may include one or more nodes 310, which may be examples of nodes 198, the storage nodes 185, and/or the node clusters 196, as described with reference to FIG. 1. In some examples, the one or more nodes may each be included in a respective node cluster 210 (e.g., the target node cluster 210-*b*).

In some examples, as described with reference to FIG. 2, a DMS may generate one or more RPFs that indicate metadata associated with replication of a source snapshot 305 from a source node cluster to a target node cluster. For example, the snapshot 305 may include one or more shards 315 corresponding to patch files of the source snapshot 305 (e.g., a shard 315-*a*, a shard 315-*b*, a shard 315-*c*, and a shard 315-*d*). The DMS may generate an RPF for each shard 315 that indicates, for each block of data of the corresponding shard, either a reference (e.g., a link) to a block of data of a base snapshot stored on the target node cluster that is the same as the corresponding block of data of the source snapshot 305 stored on the source node cluster, or an offset representing a block of data stored on the source node cluster that is to be replicated (e.g., copied, pulled) to the target node cluster (e.g., from an MJF associated with the source snapshot 305).

In some examples, an amount of data to be replicated from one or more shards 315 may be different. As an illustrative example, RPFs corresponding to the shard 315-*a* and the shard 315-*d* may indicate that 10 gigabytes (GB) of data is to be pulled from the source node cluster to the target node cluster, and RPFs corresponding to the shard 315-*b* and the shard 315-*c* may indicate that 0 GB of data is to be pulled from the source node cluster to the target node cluster. In some examples, a total amount of data to be pulled may be equal to a size of the blocks of data multiplied by the quantity of blocks of data to be pulled from the source node cluster.

In some examples, a child job 320 may be run on one or more nodes 310 of the target node cluster to perform the replication corresponding to each shard 315. For example, a child job 320-*a* run on a node 310-*a* may replicate the shard 315-*a* and the shard 315-*b* to the target node cluster, and a child job 320-*b* run on a node 310-*b* may replicate the shard 315-*c* and the shard 315-*d* to the target node cluster (e.g., in accordance with the corresponding RPFs). In some examples, the node 310-*a* and the node 310-*b* may run the child job 320-*a* and the child job 320-*b*, respective, in parallel (e.g., at the same time).

The system 300 (e.g., the DMS) may allocate the child jobs 320 across the nodes 310 in a balanced manner such that a total amount of data to be replicated by each node 310 is relatively more even (e.g., the same or within a threshold amount) than an unbalanced job allocation in which, for example, the node 310-*a* replicates all of the data and the node 310-*b* does not replicate any data, among other examples. Such techniques may reduce a duration of the replication operation. As an illustrative example, if a child job 320 run by the node 310-*a* replicates the shard 315-*a* and the shard 315-*d* while a child job 320 run by the node 310-*b* replicates the shard 315-*b* and the shard 315-*c*, the replication operation may last a first duration (e.g., a duration for the node 310-*a* to replicate 20 GB of data, such as 20 GB/100 Megabits (Mb) per second (Mbps)=1600 seconds).

However, if the child job 320-*a* run by the node 310-*a* replicates the shard 315-*a* and the shard 315-*b* while the child job 320-*b* run by the node 310-*b* replicates the shard 315-*c* and the shard 315-*d*, the replication operation may last a second duration that is shorter than the first duration (e.g., a duration for each of the node 310-*a* and the node 310-*b* to replicate 10 GB of data, such as 10 GB/100 Mbps=800 seconds). Accordingly, by balancing the distribution of data to be replicated across child jobs 320 on different nodes 310, the system 300 may use relatively more available network resources (e.g., relative more of an available bandwidth for replication), which may result in a relatively faster replication operation.

Additionally, each child job 320 may claim a network resource after determining which blocks of data are to be fetched from the source node cluster (e.g., as indicated by the RPF). Accordingly, the child jobs 320 may improve an efficiency of the replication operation as compared to child jobs 320 that may claim a network resource prior to identifying the blocks of data to be replicated (e.g., without generating the RPF prior to the replication operation).

Figure 4:
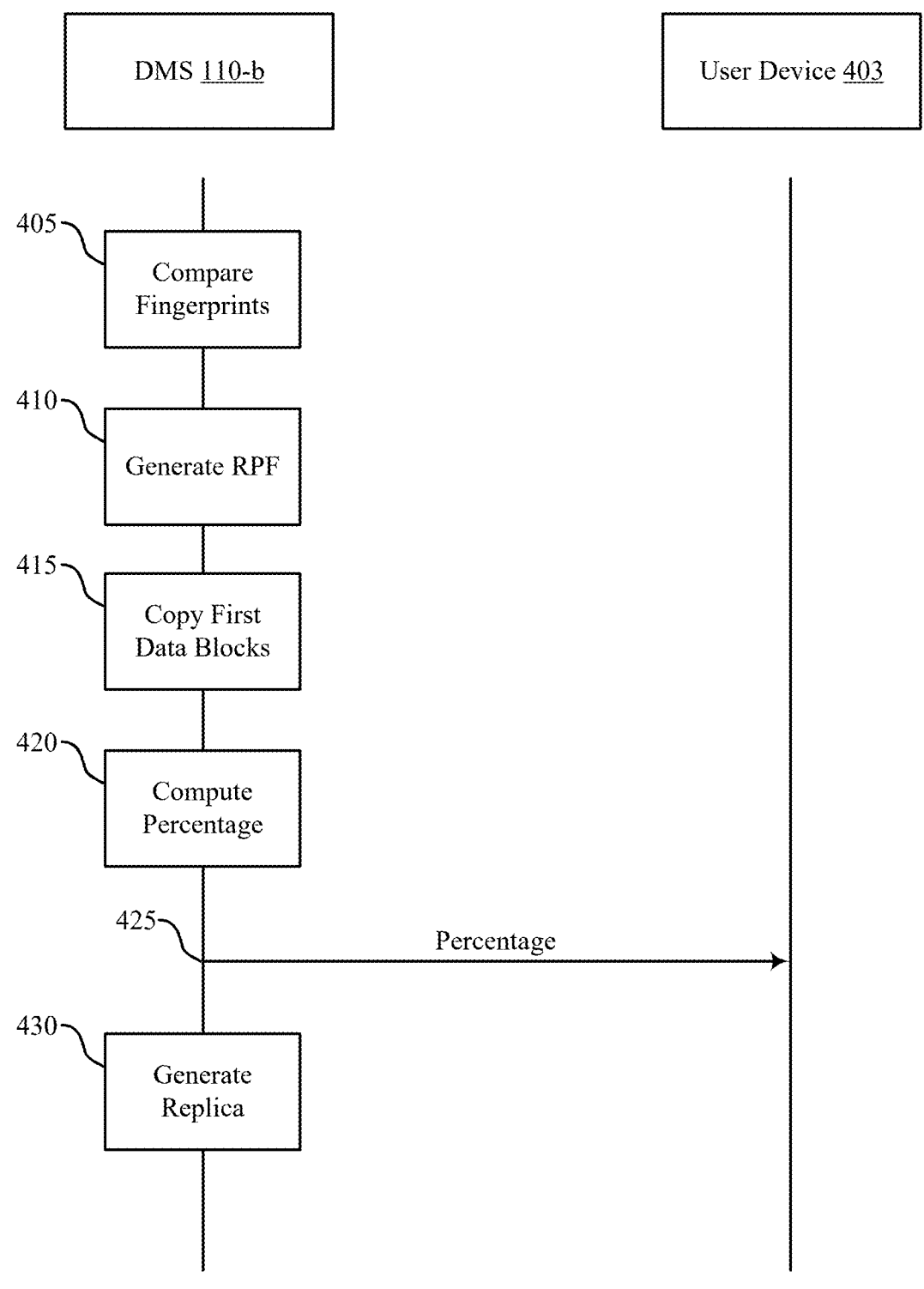
FIG. 4 shows an example of a process flow that supports fingerprint-based data replication across storage systems in accordance with aspects of the present disclosure.

FIG. 4 shows an example of a process flow 400 that supports fingerprint-based data replication across storage systems in accordance with aspects of the present disclosure. The process flow 400 may implement or may be implemented by aspects of the computing environment 100, the system 200, or the system 300. For example, the process flow 400 may be implemented by a DMS 110-*b* and a user device 403, which may be examples of a DMS 110 and a computing device 115, respectively, as described with reference to FIG. 1.

In the following description of the process flow 400, the operations between the DMS 110-*b* and the user device 403 may occur in a different order than the example order shown and, in some examples, may be performed by one or more different devices other than those shown as examples. Some operations also may be omitted from the process flow 400, and other operations may be added to the process flow 400. Further, although some operations or signaling may be shown to occur at different times for discussion purposes, these operations may actually occur at the same time.

At 405, the DMS 110-*b* may obtain a first fingerprint file associated with a source file (e.g., a source snapshot, a patch file) on a source node cluster and a second fingerprint file associated with a base file (e.g., a base snapshot) on a target node cluster. The source file may be a file (e.g., a set of data, one or more files, etc.) for replication from the source node cluster to the target node cluster. The first fingerprint file may include first fingerprints that represent (e.g., uniquely represent) a set of data blocks of the source file, and the second fingerprint file may include second fingerprints that represent (e.g., uniquely represent) a set of data blocks of the base file. For example, the first fingerprint file may include one or more hashes of ranges of values in an index file (e.g., an extent index file), which may include one or more hashes of values in a patch file associated with the source file.

In some examples, the DMS 110-*b* may compare the first fingerprint file and the second fingerprint file. The DMS 110-*b* may accordingly determine one or more entries of the index file associated with the source file that may represent data blocks in the source file that are changed from data blocks in the base file. The DMS 110-*b* may obtain (e.g., pull, generate) the one or more entries of the index file, and may compare the one or more entries with one or more entries of a second index file associated with the base file.

At 410, the DMS 110-*b* may generate an RPF including metadata that indicates one or more first data blocks of the set of data blocks of the source file that are different from corresponding data blocks in the base file (e.g., based on comparing the associated index file entries). The RPF may accordingly provide a total amount of data that is to be copied from the source node cluster to the target node cluster. In some examples, the RPF may include references (e.g., links) of one or more blocks of data of the base snapshot that are the same as a corresponding one or more second blocks of data of the source snapshot.

At 415, the DMS 110-*b* may copy the one or more first data blocks of the set of data blocks of the source file to the target node cluster (e.g., in accordance with the RPF). In some examples, to copy the one or more first data blocks, the DMS 110-*b* may generate one or more jobs for execution by one or more nodes of the node cluster (e.g., in parallel). For example, the DMS 110-*b* may generate a first job for a first node of the target node cluster and a second job for a second node of the target node cluster to be executed at a same time as the first job. The DMS 110-*b* may generate the jobs such that more of an available bandwidth for replication is full, which may enable relatively faster replication. For example, the size of the first job and the size of the second job may be balanced such that relatively more of the bandwidth for replication is in use during execution of the jobs. In some examples, the size of the first job (e.g., a quantity of data to be replicated as part of the first job) may be the same as the size of the second job (e.g., a quantity of data to be replicated as part of the second job).

In some examples (e.g., during the replication operation), at 420, the DMS 110-*b* may compute a percentage of the one or more first data blocks that have been replicated. At 425, the DMS 110-*b* may output the percentage to a user via a user device 403. The DMS 110-*b* may repeat the percentage computation and reporting process one or more times during the replication operation (e.g., to provide the user with an up-to-date completion status of the replication operation).

At 430, the DMS 110-*b* may generate the replica of the source file. For example, the DMS 110-*b* may copy the one or more first data blocks to the target node cluster and may identify one or more second data blocks of the set of data blocks of the source file that are the same as corresponding data blocks of the set of data blocks of the base file. The DMS 110-*b* may accordingly generate the replica of the source file based on the copied one or more first data blocks and the existing data blocks of the base file that match those of the source file. In some examples, the DMS 110-*b* may output, to the user via the user device 403, an indication of completion of the replication operation based on generating the replica.

Figure 5:
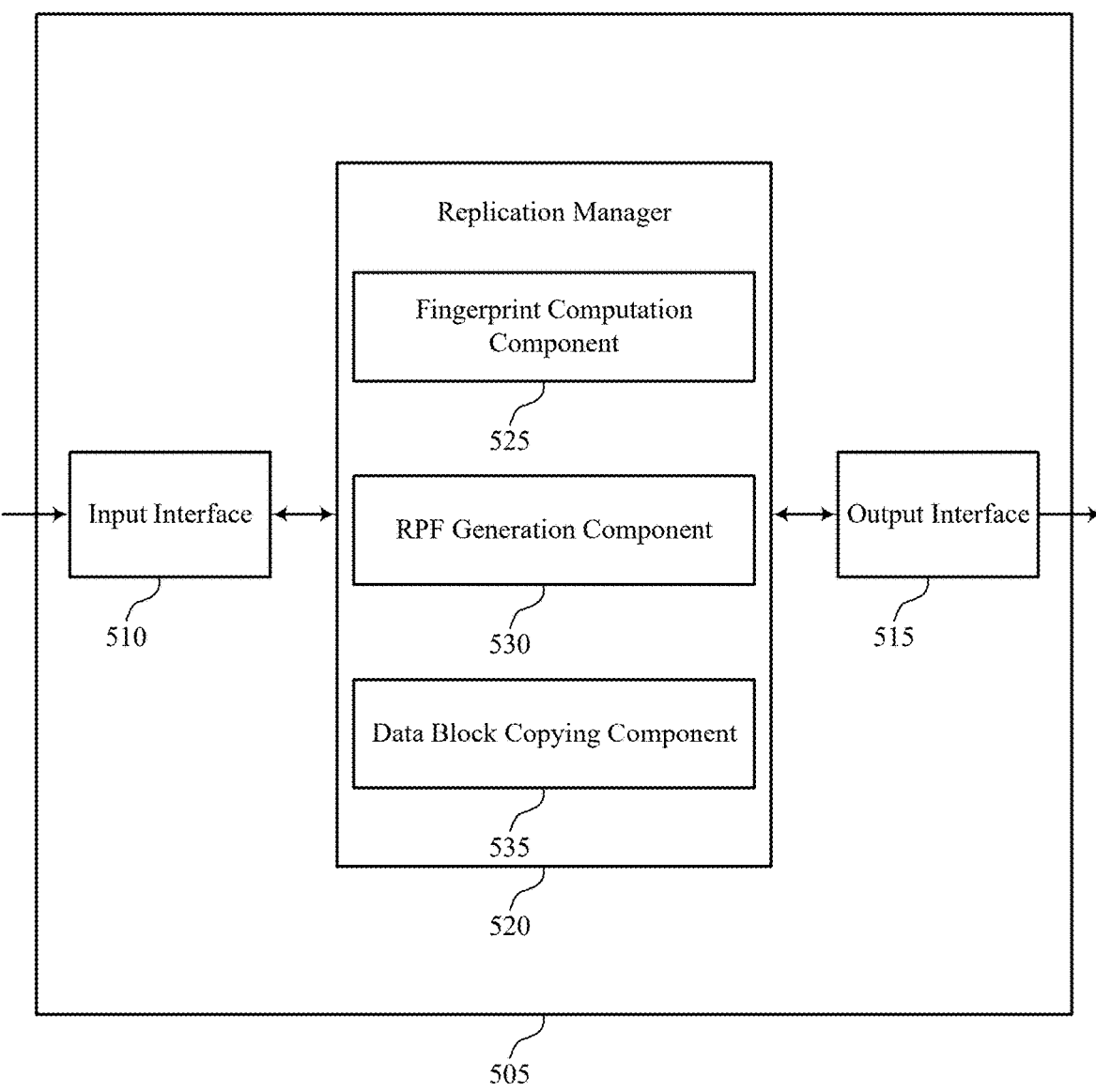
FIG. 5 shows a block diagram of an apparatus that supports fingerprint-based data replication across storage systems in accordance with aspects of the present disclosure.

FIG. 5 shows a block diagram 500 of a system 505 that supports fingerprint-based data replication across storage systems in accordance with aspects of the present disclosure. In some examples, the system 505 may be an example of aspects of one or more components described with reference to FIG. 1, such as a DMS 110. The system 505 may include an input interface 510, an output interface 515, and a replication manager 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the replication manager 520 to support fingerprint-based data replication across storage systems. In some cases, the input interface 510 may be a component of a network interface 725 as described with reference to FIG. 7.

The output interface 515 may manage output signaling for the system 505. For example, the output interface 515 may receive signaling from other components of the system 505, such as the replication manager 520, and may transmit such output signaling corresponding to (e.g., representative of or otherwise based on) such signaling to other systems or devices. In some cases, the output interface 515 may be a component of a network interface 725 as described with reference to FIG. 7.

For example, the replication manager 520 may include a fingerprint computation component 525, an RPF generation component 530, a data block copying component 535, or any combination thereof. In some examples, the replication manager 520, or various components thereof, may be configured to perform various operations (e.g., receiving, monitoring, transmitting) using or otherwise in cooperation with the input interface 510, the output interface 515, or both. For example, the replication manager 520 may receive information from the input interface 510, send information to the output interface 515, or be integrated in combination with the input interface 510, the output interface 515, or both to receive information, transmit information, or perform various other operations as described herein.

The fingerprint computation component 525 may be configured as or otherwise support a means for comparing, by a DMS and based on a replication operation for replication of a source file from a source cluster of the DMS to a target cluster of the DMS, one or more first fingerprints that uniquely represent first data blocks of the source file with one or more second fingerprints that uniquely represent second data blocks of a base file stored in the target cluster. The RPF generation component 530 may be configured as or otherwise support a means for generating, by the DMS and based on the comparison, a RPF including metadata that indicates one or more first data blocks from among the first data blocks of the source file that are different from any of the second data blocks of the base file. The data block copying component 535 may be configured as or otherwise support a means for copying, by the DMS and based on the replication operation, the one or more first data blocks from the source cluster to the target cluster in accordance with the RPF.

Figure 6:
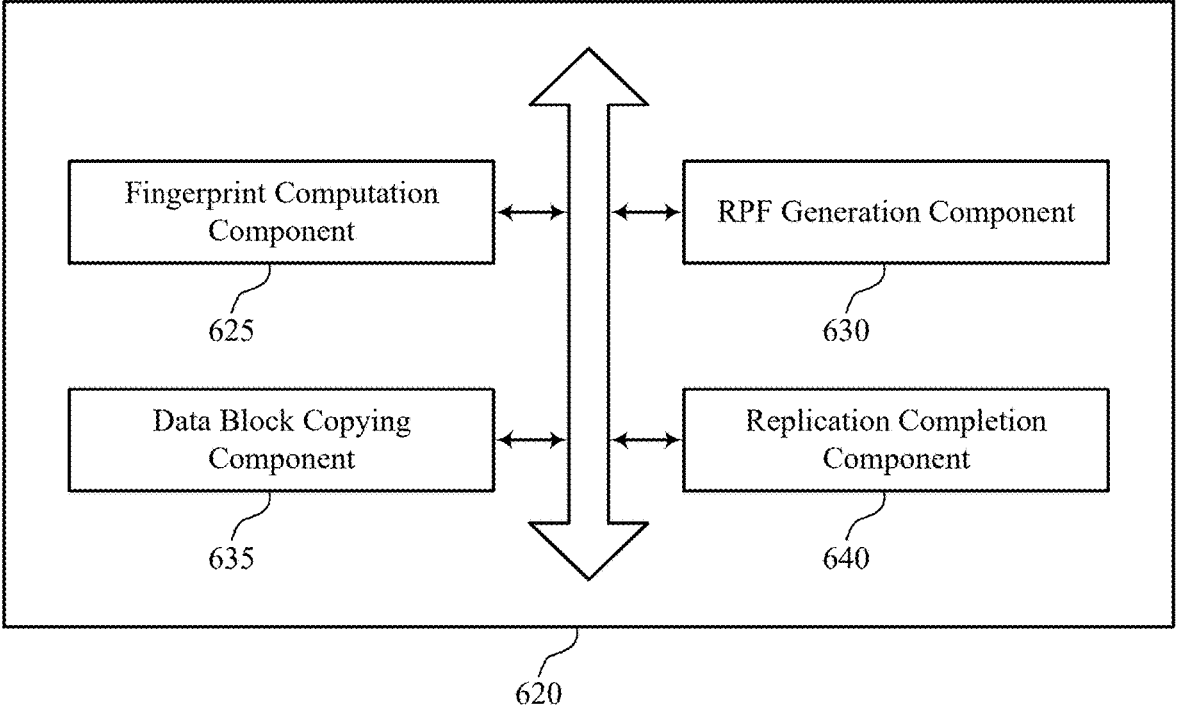
FIG. 6 shows a block diagram of a replication manager that supports fingerprint-based data replication across storage systems in accordance with aspects of the present disclosure.

FIG. 6 shows a block diagram 600 of a replication manager 620 that supports fingerprint-based data replication across storage systems in accordance with aspects of the present disclosure. The replication manager 620 may be an example of aspects of a replication manager or a replication manager 520, or both, as described herein. The replication manager 620, or various components thereof, may be an example of means for performing various aspects of fingerprint-based data replication across storage systems as described herein. For example, the replication manager 620 may include a fingerprint computation component 625, an RPF generation component 630, a data block copying component 635, a replication completion component 640, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The fingerprint computation component 625 may be configured as or otherwise support a means for comparing, by a DMS and based on a replication operation for replication of a source file from a source cluster of the DMS to a target cluster of the DMS, one or more first fingerprints that uniquely represent first data blocks of the source file with one or more second fingerprints that uniquely represent second data blocks of a base file stored in the target cluster. The RPF generation component 630 may be configured as or otherwise support a means for generating, by the DMS and based on the comparison, a RPF including metadata that indicates one or more first data blocks from among the first data blocks of the source file that are different from any of the second data blocks of the base file. The data block copying component 635 may be configured as or otherwise support a means for copying, by the DMS and based on the replication operation, the one or more first data blocks from the source cluster to the target cluster in accordance with the RPF.

In some examples, to support copying the one or more first data blocks from the source cluster to the target cluster, the data block copying component 635 may be configured as or otherwise support a means for generating, by the DMS, a first job for execution on a first node of the target cluster, where the first job is configured to copy a first subset of the one or more first data blocks from the source cluster to the target cluster. In some examples, to support copying the one or more first data blocks from the source cluster to the target cluster, the data block copying component 635 may be configured as or otherwise support a means for generating, by the DMS, a second job for execution on a second node of the target cluster in parallel with the execution of the first job, where the second job is configured to copy a second subset of the one or more first data blocks from the source cluster to the target cluster, and where generating the first job and the second job configured to copy the first subset and the second subset of the one or more first data blocks in parallel is based on the RPF.

In some examples, a first size of the first subset of the one or more first data blocks and a second size of the second subset of the one or more first data blocks are based on the RPF.

In some examples, a first size of the first subset of the one or more first data blocks is equal to a second size of the second subset of the one or more first data blocks.

In some examples, the replication completion component 640 may be configured as or otherwise support a means for computing, at a first time during the replication operation and based on the metadata that indicates the one or more first data blocks that are different from any of the second data blocks of the base file, a percentage of the one or more first data blocks that have been copied to the target cluster at the first time.

In some examples, the replication completion component 640 may be configured as or otherwise support a means for outputting, via a user interface during the replication operation, the percentage of the one or more first data blocks that have been copied to the target cluster at the first time, a second percentage of the one or more first data blocks that have yet to be copied to the target cluster at the first time, or both.

In some examples, the RPF generation component 630 may be configured as or otherwise support a means for obtaining, from the source cluster of the DMS, one or more first entries of a first index file associated with the source file, the one or more first entries representative of changed data between the source file and the base file, where the one or more first entries are based on comparing the one or more first fingerprints with the one or more second fingerprints. In some examples, the RPF generation component 630 may be configured as or otherwise support a means for comparing, based on obtaining the one or more first entries, the one or more first entries of the first index file with one or more second entries of a second index file associated with the base file on the target cluster, where generating the RPF including the metadata that indicates the one or more first data blocks is further based on comparing the one or more first entries with the one or more second entries.

In some examples, the one or more first fingerprints include first hash values each representative of a respective set of first entries within the first index file associated with the source file, and the one or more second fingerprints include second hash values each representative of a respective set of second entries within a second index associated with the base file.

In some examples, the first index file includes a set of multiple first entries, each first entry of the set of multiple first entries representative of a respective first range of data blocks within the source file, and a second index associated with the base file includes a set of multiple second entries, each second entry of the set of multiple second entries representative of a respective second range of data blocks within the base file.

In some examples, the data block copying component 635 may be configured as or otherwise support a means for identifying one or more second data blocks, from among the first data blocks, that are the same as one or more of the second data blocks of the base file. In some examples, the data block copying component 635 may be configured as or otherwise support a means for generating, as part of the replication operation, a replica of the source file on the target cluster based on copying the one or more first data blocks and identifying the one or more second data blocks.

Figure 7:
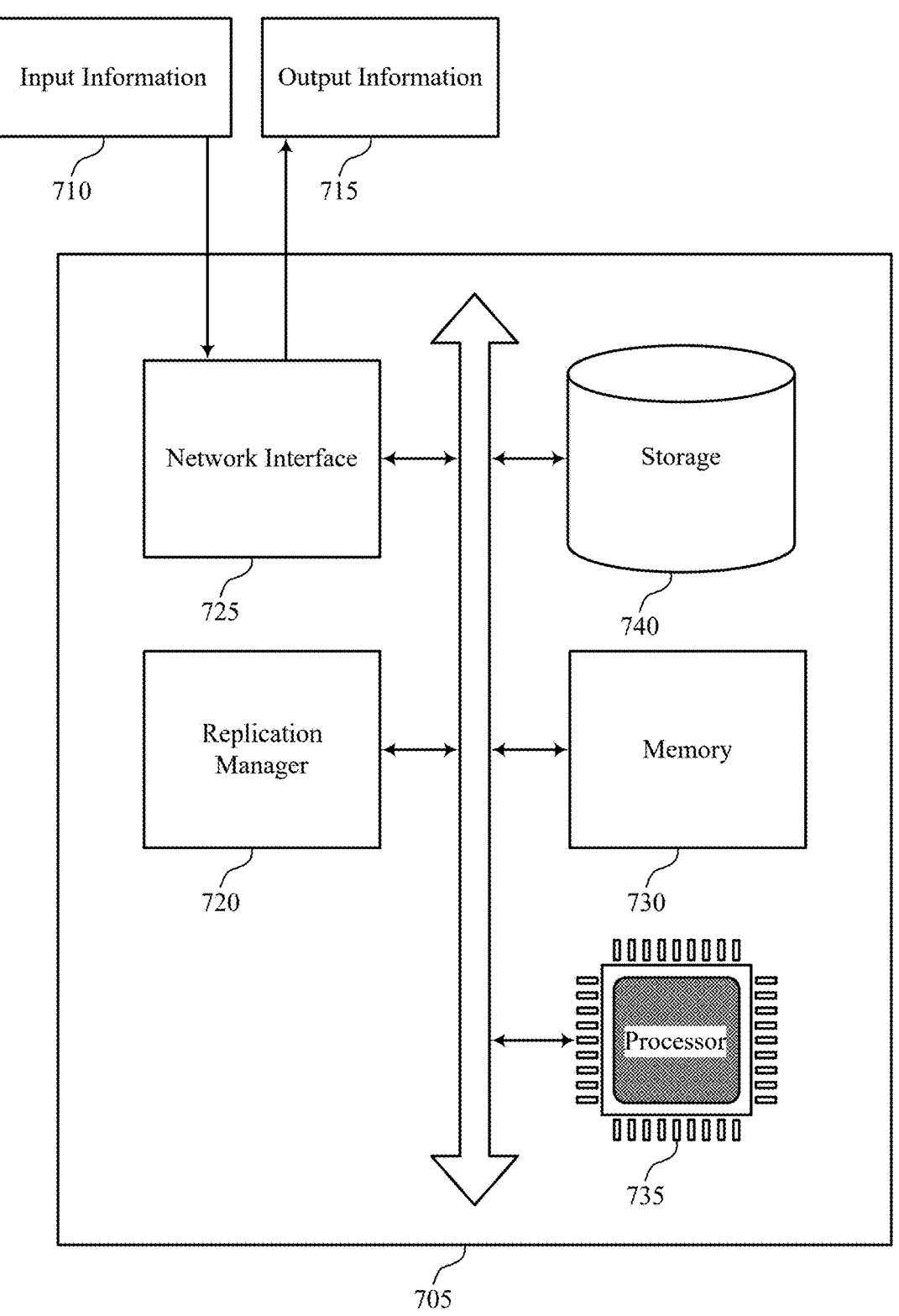
FIG. 7 shows a diagram of a system including a device that supports fingerprint-based data replication across storage systems in accordance with aspects of the present disclosure.

FIG. 7 shows a block diagram 700 of a system 705 that supports fingerprint-based data replication across storage systems in accordance with aspects of the present disclosure. The system 705 may be an example of or include components of a system 505 as described herein. The system 705 may include components for data management, including components such as a replication manager 720, an input information 710, an output information 715, a network interface 725, at least one memory 730, at least one processor 735, and a storage 740. These components may be in electronic communication or otherwise coupled with each other (e.g., operatively, communicatively, functionally, electronically, electrically; via one or more buses, communications links, communications interfaces, or any combination thereof). Additionally, the components of the system 705 may include corresponding physical components or may be implemented as corresponding virtual components (e.g., components of one or more virtual machines). In some examples, the system 705 may be an example of aspects of one or more components described with reference to FIG. 1, such as a DMS 110.

The network interface 725 may enable the system 705 to exchange information (e.g., input information 710, output information 715, or both) with other systems or devices (not shown). For example, the network interface 725 may enable the system 705 to connect to a network (e.g., a network 120 as described herein). The network interface 725 may include one or more wireless network interfaces, one or more wired network interfaces, or any combination thereof. In some examples, the network interface 725 may be an example of may be an example of aspects of one or more components described with reference to FIG. 1, such as one or more network interfaces 165.

Memory 730 may include RAM, ROM, or both. The memory 730 may store computer-readable, computer-executable software including instructions that, when executed, cause the processor 735 to perform various functions described herein. In some cases, the memory 730 may contain, among other things, a basic input/output system (BIOS), which may control basic hardware or software operation such as the interaction with peripheral components or devices. In some cases, the memory 730 may be an example of aspects of one or more components described with reference to FIG. 1, such as one or more memories 175.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in a memory 730 to perform various functions (e.g., functions or tasks supporting fingerprint-based data replication across storage systems). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735. In some cases, the processor 735 may be an example of aspects of one or more components described with reference to FIG. 1, such as one or more processors 170.

Storage 740 may be configured to store data that is generated, processed, stored, or otherwise used by the system 705. In some cases, the storage 740 may include one or more HDDs, one or more SDDs, or both. In some examples, the storage 740 may be an example of a single database, a distributed database, multiple distributed databases, a data store, a data lake, or an emergency backup database. In some examples, the storage 740 may be an example of one or more components described with reference to FIG. 1, such as one or more network disks 180.

For example, the replication manager 720 may be configured as or otherwise support a means for comparing, by a DMS and based on a replication operation for replication of a source file from a source cluster of the DMS to a target cluster of the DMS, one or more first fingerprints that uniquely represent first data blocks of the source file with one or more second fingerprints that uniquely represent second data blocks of a base file stored in the target cluster. The replication manager 720 may be configured as or otherwise support a means for generating, by the DMS and based on the comparison, a RPF including metadata that indicates one or more first data blocks from among the first data blocks of the source file that are different from any of the second data blocks of the base file. The replication manager 720 may be configured as or otherwise support a means for copying, by the DMS and based at least in part on the replication operation, the one or more first data blocks from the source cluster to the target cluster in accordance with the RPF.

By including or configuring the replication manager 720 in accordance with examples as described herein, the system 705 may support techniques for fingerprint-based data replication across storage systems, which may provide one or more benefits such as, for example, reduced latency, improved user experience, reduced power consumption, and more efficient utilization of computing resources, network resources or both, among other possibilities.

FIG. 8 shows a flowchart illustrating a method 800 that supports fingerprint-based data replication across storage systems in accordance with aspects of the present disclosure. The operations of the method 800 may be implemented by a DMS or its components as described herein. For example, the operations of the method 800 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include comparing, by a DMS and based on a replication operation for replication of a source file from a source cluster of the DMS to a target cluster of the DMS, one or more first fingerprints that uniquely represent first data blocks of the source file with one or more second fingerprints that uniquely represent second data blocks of a base file stored in the target cluster. The operations of 805 may be performed in accordance with examples as disclosed herein. In some examples, aspects of the operations of 805 may be performed by a fingerprint computation component 625 as described with reference to FIG. 6.

At 810, the method may include generating, by the DMS and based on the comparison, a RPF including metadata that indicates one or more first data blocks from among the first data blocks of the source file that are different from any of the second data blocks of the base file. The operations of 810 may be performed in accordance with examples as disclosed herein. In some examples, aspects of the operations of 810 may be performed by an RPF generation component 630 as described with reference to FIG. 6.

At 815, the method may include copying, by the DMS and based on the replication operation, the one or more first data blocks from the source cluster to the target cluster in accordance with the RPF. The operations of 815 may be performed in accordance with examples as disclosed herein. In some examples, aspects of the operations of 815 may be performed by a data block copying component 635 as described with reference to FIG. 6.

FIG. 9 shows a flowchart illustrating a method 900 that supports fingerprint-based data replication across storage systems in accordance with aspects of the present disclosure. The operations of the method 900 may be implemented by a DMS or its components as described herein. For example, the operations of the method 900 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 905, the method may include comparing, by a DMS and based on a replication operation for replication of a source file from a source cluster of the DMS to a target cluster of the DMS, one or more first fingerprints that uniquely represent first data blocks of the source file with one or more second fingerprints that uniquely represent second data blocks of a base file stored in the target cluster. The operations of 905 may be performed in accordance with examples as disclosed herein. In some examples, aspects of the operations of 905 may be performed by a fingerprint computation component 625 as described with reference to FIG. 6.

At 910, the method may include generating, by the DMS and based on the comparison, a RPF including metadata that indicates one or more first data blocks from among the first data blocks of the source file that are different from any of the second data blocks of the base file. The operations of 910 may be performed in accordance with examples as disclosed herein. In some examples, aspects of the operations of 910 may be performed by an RPF generation component 630 as described with reference to FIG. 6.

At 915, the method may include copying, by the DMS and based on the replication operation, the one or more first data blocks from the source cluster to the target cluster in accordance with the RPF. The operations of 915 may be performed in accordance with examples as disclosed herein. In some examples, aspects of the operations of 915 may be performed by a data block copying component 635 as described with reference to FIG. 6.

At 920, to copy the one or more first data blocks from the source cluster to the target cluster in accordance with the RPF, the method may include generating, by the DMS, a first job for execution on a first node of the target cluster, where the first job is configured to copy a first subset of the one or more first data blocks from the source cluster to the target cluster. The operations of 920 may be performed in accordance with examples as disclosed herein. In some examples, aspects of the operations of 920 may be performed by a data block copying component 635 as described with reference to FIG. 6.

At 925, to copy the one or more first data blocks from the source cluster to the target cluster in accordance with the RPF, the method may further include generating, by the DMS, a second job for execution on a second node of the target cluster in parallel with the execution of the first job, where the second job is configured to copy a second subset of the one or more first data blocks from the source cluster to the target cluster, and where generating the first job and the second job configured to copy the first subset and the second subset of the one or more first data blocks in parallel is based on the RPF. The operations of 925 may be performed in accordance with examples as disclosed herein. In some examples, aspects of the operations of 925 may be performed by a data block copying component 635 as described with reference to FIG. 6.

A method by an apparatus is described. The method may include comparing, by a DMS and based on a replication operation for replication of a source file from a source cluster of the DMS to a target cluster of the DMS, one or more first fingerprints that uniquely represent first data blocks of the source file with one or more second fingerprints that uniquely represent second data blocks of a base file stored in the target cluster, generating, by the DMS and based on the comparison, a RPF including metadata that indicates one or more first data blocks from among the first data blocks of the source file that are different from any of the second data blocks of the base file, and copying, by the DMS and based on the replication operation, the one or more first data blocks from the source cluster to the target cluster in accordance with the RPF.

An apparatus is described. The apparatus may include one or more memories storing processor executable code, and one or more processors coupled with the one or more memories. The one or more processors may individually or collectively be operable to execute the code to cause the apparatus to compare, by a DMS and based on a replication operation for replication of a source file from a source cluster of the DMS to a target cluster of the DMS, one or more first fingerprints that uniquely represent first data blocks of the source file with one or more second fingerprints that uniquely represent second data blocks of a base file stored in the target cluster, generate, by the DMS and based on the comparison, a RPF including metadata that indicates one or more first data blocks from among the first data blocks of the source file that are different from any of the second data blocks of the base file, and copying, by the DMS and based at least in part on the replication operation, the one or more first data blocks from the source cluster to the target cluster in accordance with the RPF.

Another apparatus is described. The apparatus may include means for comparing, by a DMS and based on a replication operation for replication of a source file from a source cluster of the DMS to a target cluster of the DMS, one or more first fingerprints that uniquely represent first data blocks of the source file with one or more second fingerprints that uniquely represent second data blocks of a base file stored in the target cluster, means for generating, by the DMS and based on the comparison, a RPF including metadata that indicates one or more first data blocks from among the first data blocks of the source file that are different from any of the second data blocks of the base file, and means for copying, by the DMS and based on the replication operation, the one or more first data blocks from the source cluster to the target cluster in accordance with the RPF.

A non-transitory computer-readable medium storing code is described. The code may include instructions executable by one or more processors to compare, by a DMS and based on a replication operation for replication of a source file from a source cluster of the DMS to a target cluster of the DMS, one or more first fingerprints that uniquely represent first data blocks of the source file with one or more second fingerprints that uniquely represent second data blocks of a base file stored in the target cluster, generate, by the DMS and based on the comparison, a RPF including metadata that indicates one or more first data blocks from among the first data blocks of the source file that are different from any of the second data blocks of the base file, and copying, by the DMS and based at least in part on the replication operation, the one or more first data blocks from the source cluster to the target cluster in accordance with the RPF.

In some examples of the method, apparatus, and non-transitory computer-readable medium described herein, operations, features, means, or instructions for copying the one or more first data blocks from the source cluster to the target cluster may include operations, features, means, or instructions for generating, by the DMS, a first job for execution on a first node of the target cluster, where the first job may be configured to copy a first subset of the one or more first data blocks from the source cluster to the target cluster and generating, by the DMS, a second job for execution on a second node of the target cluster in parallel with the execution of the first job, where the second job may be configured to copy a second subset of the one or more first data blocks from the source cluster to the target cluster, and where generating the first job and the second job configured to copy the first subset and the second subset of the one or more first data blocks in parallel may be based on the RPF.

In some examples of the method, apparatus, and non-transitory computer-readable medium described herein, a first size of the first subset of the one or more first data blocks and a second size of the second subset of the one or more first data blocks may be based on the RPF.

In some examples of the method, apparatus, and non-transitory computer-readable medium described herein, a first size of the first subset of the one or more first data blocks may be equal to a second size of the second subset of the one or more first data blocks.

Some examples of the method, apparatus, and non-transitory computer-readable medium described herein may further include operations, features, means, or instructions for computing, at a first time during the replication operation and based on the metadata that indicates the one or more first data blocks that may be different from any of the second data blocks of the base file, a percentage of the one or more first data blocks that may have been copied to the target cluster at the first time.

Some examples of the method, apparatus, and non-transitory computer-readable medium described herein may further include operations, features, means, or instructions for outputting, via a user interface during the replication operation, the percentage of the one or more first data blocks that may have been copied to the target cluster at the first time, a second percentage of the one or more first data blocks that may have yet to be copied to the target cluster at the first time, or both.

Some examples of the method, apparatus, and non-transitory computer-readable medium described herein may further include operations, features, means, or instructions for obtaining, from the source cluster of the DMS, one or more first entries of a first index file associated with the source file, the one or more first entries representative of changed data between the source file and the base file, where the one or more first entries may be based on comparing the one or more first fingerprints with the one or more second fingerprints, and comparing, based on obtaining the one or more first entries, the one or more first entries of the first index file with one or more second entries of a second index file associated with the base file on the target cluster, where generating the RPF including the metadata that indicates the one or more first data blocks may be further based on comparing the one or more first entries with the one or more second entries.

In some examples of the method, apparatus, and non-transitory computer-readable medium described herein, the one or more first fingerprints include first hash values each representative of a respective set of first entries within the first index file associated with the source file, and the one or more second fingerprints include second hash values each representative of a respective set of second entries within a second index associated with the base file.

In some examples of the method, apparatus, and non-transitory computer-readable medium described herein, the first index file includes a set of multiple first entries, each first entry of the set of multiple first entries representative of a respective first range of data blocks within the source file, and a second index associated with the base file includes a set of multiple second entries, each second entry of the set of multiple second entries representative of a respective second range of data blocks within the base file.

Some examples of the method, apparatus, and non-transitory computer-readable medium described herein may further include operations, features, means, or instructions for identifying one or more second data blocks, from among the first data blocks, that may be the same as one or more of the second data blocks of the base file and generating, as part of the replication operation, a replica of the source file on the target cluster based on copying the one or more first data blocks and identifying the one or more second data blocks.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

obtaining a first fingerprint file associated with a source file on a source cluster, the first fingerprint file comprising one or more first fingerprints that uniquely represent first data blocks of the source file, each fingerprint of the one or more first fingerprints comprising a hash of a range of values in a first index file, the values in the first index file comprising respective hashes of respective values in a patch file associated with the source file;

comparing, by a data management system and based at least in part on a replication operation for replication of the source file from the source cluster of the data management system to a target cluster of the data management system, the one or more first fingerprints of the first fingerprint file with one or more second fingerprints of a second fingerprint file that uniquely represent second data blocks of a base file stored in the target cluster;

generating, by the data management system and based at least in part on the comparison, a replication profile comprising metadata that indicates one or more first data blocks from among the first data blocks of the source file that are different from any of the second data blocks of the base file; and generating one or more jobs for execution on one or more nodes of the target cluster, the one or more jobs configured to copy, based at least in part on the replication operation, the one or more first data blocks from the source cluster to the target cluster in accordance with the replication profile.

2. The method of claim 1, wherein generating the one or more jobs for execution on the one or more nodes comprises:

generating, by the data management system, a first job for execution on a first node of the target cluster, wherein the first job is configured to copy a first subset of the one or more first data blocks from the source cluster to the target cluster; and generating, by the data management system, a second job for execution on a second node of the target cluster in parallel with the execution of the first job, wherein the second job is configured to copy a second subset of the one or more first data blocks from the source cluster to the target cluster, and wherein generating the first job and the second job configured to copy the first subset and the second subset of the one or more first data blocks in parallel is based at least in part on the replication profile.

3. The method of claim 2, wherein a first size of the first subset of the one or more first data blocks and a second size of the second subset of the one or more first data blocks are based at least in part on the replication profile.

4. The method of claim 2, wherein a first size of the first subset of the one or more first data blocks is equal to a second size of the second subset of the one or more first data blocks.

5. The method of claim 1, further comprising:

computing, at a first time during the replication operation and based at least in part on the metadata that indicates the one or more first data blocks that are different from any of the second data blocks of the base file, a percentage of the one or more first data blocks that have been copied to the target cluster at the first time.

6. The method of claim 5, further comprising:

outputting, via a user interface during the replication operation, the percentage of the one or more first data blocks that have been copied to the target cluster at the first time, a second percentage of the one or more first data blocks that have yet to be copied to the target cluster at the first time, or both.

7. The method of claim 1, further comprising:

obtaining, from the source cluster of the data management system, one or more first entries of the first index file associated with the source file, wherein the one or more first entries are based at least in part on comparing the one or more first fingerprints with the one or more second fingerprints; and comparing, based at least in part on obtaining the one or more first entries, the one or more first entries of the first index file with one or more second entries of a second index file associated with the base file on the target cluster, wherein generating the replication profile comprising the metadata that indicates the one or more first data blocks is further based at least in part on comparing the one or more first entries with the one or more second entries.

8. The method of claim 1, further comprising:

identifying one or more second data blocks, from among the first data blocks, that are the same as one or more of the second data blocks of the base file; and generating, as part of the replication operation, a replica of the source file on the target cluster based at least in part on copying the one or more first data blocks and identifying the one or more second data blocks.

9. An apparatus, comprising:

one or more memories storing processor-executable code; and one or more processors coupled with the one or more memories and individually or collectively operable to execute the code to cause the apparatus to:

obtain a first fingerprint file associated with a source file on a source cluster, the first fingerprint file comprising one or more first fingerprints that uniquely represent first data blocks of the source file, each fingerprint of the one or more first fingerprints comprising a hash of a range of values in a first index file, the values in the first index file comprising respective hashes of respective values in a patch file associated with the source file;

compare, by a data management system and based at least in part on a replication operation for replication of the source file from the source cluster of the data management system to a target cluster of the data management system, the one or more first fingerprints of the first fingerprint file with one or more second fingerprints of a second fingerprint file that uniquely represent second data blocks of a base file stored in the target cluster;

generate, by the data management system and based at least in part on the comparison, a replication profile comprising metadata that indicates one or more first data blocks from among the first data blocks of the source file that are different from any of the second data blocks of the base file; and generate one or more jobs for execution on one or more nodes of the target cluster, the one or more jobs configured to copy, based at least in part on the replication operation, the one or more first data blocks from the source cluster to the target cluster in accordance with the replication profile.

10. The apparatus of claim 9, wherein, to generate the one or more jobs for execution, the one or more processors are individually or collectively operable to execute the code to cause the apparatus to:

generate, by the data management system, a first job for execution on a first node of the target cluster, wherein the first job is configured to copy a first subset of the one or more first data blocks from the source cluster to the target cluster; and generate, by the data management system, a second job for execution on a second node of the target cluster in parallel with the execution of the first job, wherein the second job is configured to copy a second subset of the one or more first data blocks from the source cluster to the target cluster, and wherein the one or more processors are individually or collectively operable to execute the code to cause the apparatus to generate the first job and the second job configured to copy the first subset and the second subset of the one or more first data blocks in parallel based at least in part on the replication profile.

11. The apparatus of claim 10, wherein a first size of the first subset of the one or more first data blocks and a second size of the second subset of the one or more first data blocks are based at least in part on the replication profile.

12. The apparatus of claim 10, wherein a first size of the first subset of the one or more first data blocks is equal to a second size of the second subset of the one or more first data blocks.

13. The apparatus of claim 9, wherein the one or more processors are individually or collectively further operable to execute the code to cause the apparatus to:

compute, at a first time during the replication operation and based at least in part on the metadata that indicates the one or more first data blocks that are different from any of the second data blocks of the base file, a percentage of the one or more first data blocks that have been copied to the target cluster at the first time.

14. The apparatus of claim 9, wherein the one or more processors are individually or collectively further operable to execute the code to cause the apparatus to:

obtain, from the source cluster of the data management system, one or more first entries of the first index file associated with the source file, wherein the one or more first entries are based at least in part on comparing the one or more first fingerprints with the one or more second fingerprints; and compare, based at least in part on obtaining the one or more first entries, the one or more first entries of the first index file with one or more second entries of a second index file associated with the base file on the target cluster, wherein the one or more processors are individually or collectively operable to execute the code to cause the apparatus to generate the replication profile comprising the metadata that indicates the one or more first data blocks further based at least in part on comparing the one or more first entries with the one or more second entries.

15. The apparatus of claim 9, wherein the one or more processors are individually or collectively further operable to execute the code to cause the apparatus to:

identify one or more second data blocks, from among the first data blocks, that are the same as one or more of the second data blocks of the base file; and generate, as part of the replication operation, a replica of the source file on the target cluster based at least in part on copying the one or more first data blocks and identifying the one or more second data blocks.

16. A non-transitory computer-readable medium storing code, the code comprising instructions executable by one or more processors to:

obtain a first fingerprint file associated with a source file on a source cluster, the first fingerprint file comprising one or more first fingerprints that uniquely represent first data blocks of the source file, each fingerprint of the one or more first fingerprints comprising a hash of a range of values in a first index file, the values in the first index file comprising respective hashes of respective values in a patch file associated with the source file;

compare, by a data management system and based at least in part on a replication operation for replication of the source file from the source cluster of the data management system to a target cluster of the data management system, the one or more first fingerprints of the first fingerprint file with one or more second fingerprints of a second fingerprint file that uniquely represent second data blocks of a base file stored in the target cluster;

generate, by the data management system and based at least in part on the comparison, a replication profile comprising metadata that indicates one or more first data blocks from among the first data blocks of the source file that are different from any of the second data blocks of the base file; and generate one or more jobs for execution on one or more nodes of the target cluster, the one or more jobs configured to copy, based at least in part on the replication operation, the one or more first data blocks from the source cluster to the target cluster in accordance with the replication profile.

17. The non-transitory computer-readable medium of claim 16, wherein, to generate the one or more jobs for execution, the instructions are executable by the one or more processors to:

generate, by the data management system, a first job for execution on a first node of the target cluster, wherein the first job is configured to copy a first subset of the one or more first data blocks from the source cluster to the target cluster; and generate, by the data management system, a second job for execution on a second node of the target cluster in parallel with the execution of the first job, wherein the second job is configured to copy a second subset of the one or more first data blocks from the source cluster to the target cluster, and wherein the instructions are executable by the one or more processors to generate the first job and the second job configured to copy the first subset and the second subset of the one or more first data blocks in parallel based at least in part on the replication profile.

18. The non-transitory computer-readable medium of claim 16, wherein the instructions are further executable by the one or more processors to:

compute, at a first time during the replication operation and based at least in part on the metadata that indicates the one or more first data blocks that are different from any of the second data blocks of the base file, a percentage of the one or more first data blocks that have been copied to the target cluster at the first time.

* * * * *